United States Patent [19]
Hutchinson

[11] 3,731,233
[45] May 1, 1973

[54] MINIMUM SHIFT KEYING MODULATING APPARATUS

[75] Inventor: William M. Hutchinson, Corona Del Mar, Calif.

[73] Assignee: Collins Radio Company, Dallas, Tex.

[22] Filed: Nov. 17, 1971

[21] Appl. No.: 199,706

[52] U.S. Cl. ..................332/9 R, 178/66 R, 325/163, 331/23, 332/16 R

[51] Int. Cl. ..............................................H04l 27/20

[58] Field of Search .....................332/9 R, 9 T, 16 R, 332/16 T, 18; 329/122; 331/18, 23, 25; 325/163, 30; 178/66 R, 88 R

[56] References Cited

UNITED STATES PATENTS

| | | | |
|---|---|---|---|
| 3,401,353 | 9/1968 | Hughes | 331/18 X |
| 2,977,417 | 3/1961 | Doelz et al. | 178/66 R X |
| 3,514,718 | 5/1970 | Newton | 331/25 X |
| 3,638,135 | 1/1972 | Stover | 331/25 X |
| 3,674,934 | 7/1972 | Gooding et al. | 178/88 |

*Primary Examiner*—Alfred L. Brody
*Attorney*—Bruce C. Lutz et al.

[57] ABSTRACT

A minimum shift keying transmitter utilizing a voltage controlled oscillator and logic circuitry for altering the frequency output of the oscillator in accordance with the logic level of the binary data to be supplied while preventing phase discontinuities in the output signal.

8 Claims, 1 Drawing Figure

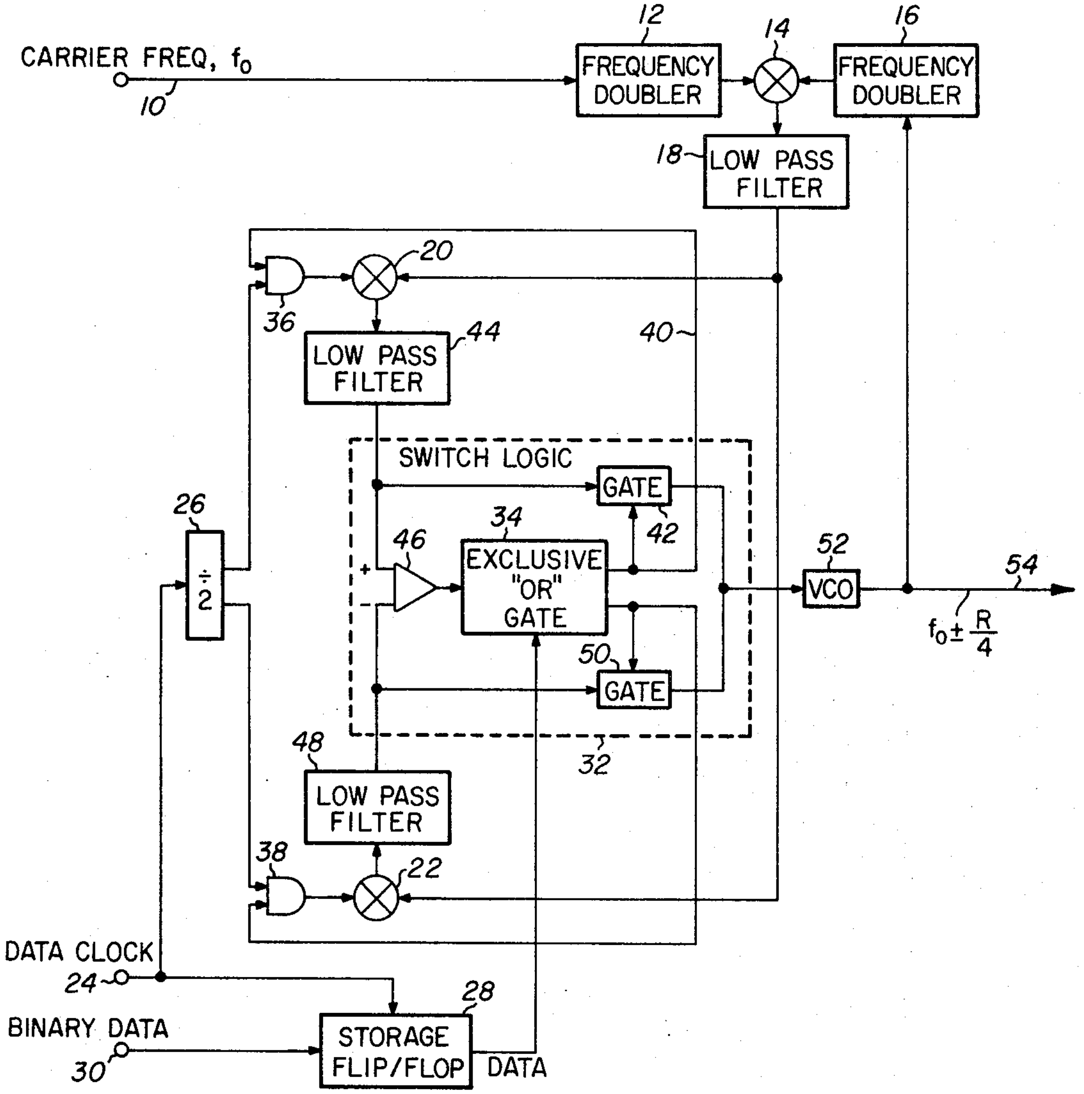
CARRIER FREQ, $f_0$
10
12
FREQUENCY DOUBLER
14
16
FREQUENCY DOUBLER
18
LOW PASS FILTER
20
36
44
LOW PASS FILTER
40
SWITCH LOGIC
GATE
42
26
÷ 2
34
46
EXCLUSIVE "OR" GATE
+
−
52
VCO
54
$f_0 \pm \frac{R}{4}$
50
GATE
32
48
LOW PASS FILTER
38
22
DATA CLOCK
24
28
BINARY DATA
30
STORAGE FLIP/FLOP
DATA

MINIMUM SHIFT KEYING MODULATING APPARATUS

THE INVENTION

The present invention is generally related to electronics and more specifically related to a frequency shift keyed transmitter. Even more specifically the apparatus is related to a minimum shift keyed modulator.

Minimum shift keying is defined as a phase continuous frequency shift keyed modulation where the keyed frequency shift is precisely plus or minus one-fourth the data rate from the center frequency of the carrier. This modulation technique can also be equivalently described as a form of phase shift keying (PSK) where 180° phase reversals are applied to two quadrature channels each with cosine shaping and each delayed with respect to the other by one-half a pulse interval.

Minimum shift keying is described in detail in U.S. Pat. No. 2,977,417 issued Mar. 28, 1961, to M. L. Doelz et al. and assigned to the same assignee as the present invention. The MSK technique described by Doelz and utilized by the present invention has the advantages of a constant amplitude angle modulated signal capable of passing a hard limiting amplifier without degradation, a high density of data rate per bandwidth approaching 2 bits per second per hertz of bandwith and optimum performance in white noise equal to that obtainable with any data modulation technique.

The circuitry described in the Doelz et al. patent, however, is fairly complicated and requires linear modulators for the cosine pulse weighting function as well as accurate frequency sources within the modulator and an accurate summing network to combine quadrature channels. Further, the Doelz et al. system is unsuitable for high data rates where accordingly high carrier frequencies are required.

On the other hand, the present invention, while usable over a very wide range of frequencies, is especially advantageous where the data rate is from $10^5$ to $10^8$ bits per second and where the carrier frequency is from $10^7$ to $10^{11}$ hertz. Further, the present invention requires very little change in circuitry to cover an extremely wide range of data rates and carrier frequencies while maintaining acceptable performance standards. These advantages are obtained because of the completely different approach to obtaining the modulation from that utilized by Doelz et al. and because the components are noncritical. In other words, the mixers and phase detectors can be of switching types and have no critical distortion requirements while the VCO is locked within a phase locked loop and thus is continually servoed to the proper frequency.

It is thus an object of the present invention to provide an improved MSK modulator.

Further objects and advantages of the present invention will be apparent from a reading of the specification and appended claims in conjunction with the circuit block diagram of one embodiment of the invention.

In the drawing an input lead 10 is utilized to supply a carrier frequency $f_0$ to a first frequency doubler 12 whose output is supplied to a mixer 14. Mixer 14 also receives an input from a second frequency doubler 16. An output of the mixer 14 is supplied through a low pass filter 18 to a pair of phase detectors or further mixers 20 and 22. An input terminal 24 supplies clock signals for the data and is connected to a divide by 2 flip-flop 26 and to a storage flip-flop 28. A binary data terminal 30 supplies binary data to the storage flip-flop 28 where it is clocked through in accordance with the data clock signal from 24 to supply data to logic circuitry 32 contained within the dash lines and more specifically to an exclusive OR gate 34 within block 32. The flip-flop 26 divides the input clocks in half and provides every other pulse to a first AND gate 36 with the alternate or intermediate pulses to an AND gate 38. One output lead 40 of exclusive OR gate 34 supplies a second input to AND gate 36 and also supplies an input to a gate 42. An output of AND gate 36 provides a second input to phase detector 20 whose output is supplied to a first low-pass filter 44 having its output connected to a second input of gate 42 and to a non-inverting input of a differential amplifier 46. AND gate 38 has an output connected to phase detector 22 which in turn has its output connected to a low-pass filter 48. An output of low-pass filter 48 is connected to supply input signals to a gate 50 as well as to an inverting second input of the differential amplifier 46. An output of differential amplifier 46 provides a second input to the exclusive OR gate 34. A second output of exclusive OR gate 34 is supplied to provide a second input to each of gates 50 and 38. The outputs of the two gates 42 and 50 are connected together and supplied as an input to a voltage controlled oscillator or VCO 52. An output of VCO 52 is supplied to an output terminal 54 and also as an input to the frequency doubler 16.

In the embodiment shown the cut-off frequency of the low-pass filter 18 is sufficient to pass a frequency equal to one-half the data rate. The cut-off frequency of the low-pass filters 44 and 48 is much less than one-half the data rate (approximately one-tenth). Since the data clock is exactly the same frequency as the binary data, the output of each of the leads from the divide by two flip-flop 26 occurs at one-half the data rate. The frequency doubler 12, however, causes an input to be applied to mixer 14 of twice the carrier frequency while the input from frequency doubler 16 is 2 times the carrier frequency $\pm$ 2R/4 or one-half the data rate R. When these two signals are mixed, the output is a combination of the sum and difference frequencies. The low-pass filter 18 removes the sum frequency and allows only the difference frequency of R/2 to pass to the mixers 20 and 22.

As previously implied, the VCO 52 is part of a phase locked loop (PLL) which is locked in frequency to either $f_0 + R/4$ or $f_0 - R/4$ according to the data input on lead 30. The switch logic 32 in the embodiment shown insures that, given a VCO 52 with a positive frequency versus voltage transfer function, the upper shift frequency corresponds to data equal to a binary 1 while the lower frequency is the result of a binary 0. The data input to exclusive OR gate 34 switches the VCO 52 to the correct control voltage from either filter 44 or 48 via the gates 42 and 50. The low pass filters 44 and 48 have a sufficiently long time constant to hold their output voltages at a relatively constant direct voltage level when the data input is such that that particular filter is switched out of the phase locked loop. When different binary data levels are supplied, that filter is switched back in and supplies the control voltages to the VCO.

As will be realized, a mixture of binary 1's and 0's is required to maintain the correct control voltages in both low pass filters 44 and 48. This can be accomplished either by the data itself being relatively random or by utilizing a randomizer prior to supplying data to lead 30. In explaining the logic of the circuitry 32, it must be assumed that the differential limiting amplifier 46 provides a logic 1 output when the output of filter 44 exceeds that of filter 48. Under this condition and with a logic 1 being supplied from the data line of flip-flop 28, the exclusive OR gate will supply a logic 0 output to gates 50 and 38 and a logic 1 output to gates 36 and 42. Thus, the positive signal from filter 44 is passed through gate 42 to control the VCO 52. The output frequency for this period in time will be the basic carrier frequency plus one-forth the data rate frequency. As long as the data input remains at a logic 1 level, the mixer 14 in combination with filter 18 will supply an output signal to the two mixers 20 and 22 equal to one-half the data rate. However, the AND gate 36 is only activated for every other binary data period since during the intermediate data periods a logic 0 is received from flip-flop 26. The output from mixer 20 is a direct voltage with pulsating signals superimposed thereupon which are filtered out by low-pass filter 44. Since a low-pass filter such as 44 is basically a storage device or integration means, the output will be held during the intermediate binary data periods when inputs are not being supplied thereto because gate 36 is not activated.

As long as the output of the exclusive OR gate 34 is a logic 0 due to the binary data being a logic 1, the AND gate 38 will not be activated and there will be no input supplied to low-pass filter 48.

When the binary data supplied at lead 30 changes to a logic 0, the exclusive OR gate 34 will change its outputs upon the occurrence of the next data clock appearing at input 24 and activate gates 50 and 38. As previously indicated, low-pass filter 48 was defined as having a negative output which when passed through gate 50 will change the VCO to its lower operating frequency. The relative inputs to differential amplifier 46 will still remain the same by the fact that the exclusive OR gate 34 is now receiving unlike inputs, its output will have changed to provide the aforementioned change in output voltages to deactivate gates 42 and 36 and activate gates 38 and 50. As long as the data remains at a logic 0, the detector 22 will operate on alternate binary data periods. These alternate binary data periods are the ones which would have been intermediate those during which phase detector 20 operated in binary data logic 1 conditions.

The system can now be seen to operate as a phase lock loop. The control voltage for the phase lock loop is derived via mixer 20 and low-pass filter 44 during a binary "1" input on 30, and via mixer 22 and low-pass filter 48 during a binary "0" input. The loop is locked such that the output frequency is $f_0 + R/4$ for the binary "1" input, and is $f_0 - R/4$ for the binary "0" input.

It is noteworthy that if the output of low-pass filter 44 is positive then the output of low-pass filter 48 will be negative. This is true if the output of low-pass filter 18 is a continuous sine wave because it will be detected against the complementary outputs of flip-flop 26 which are necessarily out of phase. However, the outputs of low-pass filters 44 and 48 to gates 42 and 50 need not be symmetrical with respect to zero because the voltage frequency characteristic of the VCO may not be symmetrical with respect to $f_0$.

In order for the system to work properly, it is necessary that the instantaneous phase of $2f_0$ and $2f_0 \pm R/2$ be the same at the time a data change is made. This prevents a phase discontinuity on the R/2 difference frequency when the VCO frequency switches from $f_0 + R/4$ to $f_0 - R/4$ or vice versa. When the loop is locked to either frequency, such as the positive frequency assumed above, the relative phase of the outputs from divide by two flip-flop 26 to the AND gates 36 and 38 is $\pm 90°$. Since the data is switched synchronously with the transitions of the divide by two output, that is at 0° or 180°, the output of low-pass filter 18 must be at $\pm 90°$. Under these conditions the output from mixer 14 is at the peak of a sine wave rather than at the 0 crossing. Therefore, the two signals $2f_0$ and $2f_0 \pm R/2$ are at the that time instantaneously in phase.

This insures that the output of low-pass filter 18 is a continuous sine wave, without any random phase shifts imposed by the data modulation. As a result low-pass filters 44 and 48 output a voltage which is independent of the data input since regardless of when gates 36 or 38 are enabled mixers 20 and 22 are presented with signals from both flip-flop 26 and low-pass filter 18 whose phase relationship is not dependent on the data. This is necessary for the loop to maintain a locked condition during random data transmission.

A single embodiment of the invention has been described. However, modifications to the embodiment shown can be provided and still fall within the scope of the claims. As an example, the frequency of the signals supplied to mixer 14 could be quadrupled instead of doubled to thereby eliminate the need for the second low pass filter 48 along with the dividing network 26 and the AND gate 38. On the other hand, the frequency need not be doubled to mixer 14 if a four-phase switching network were derived rather than the two-phase switch as shown in the embodiment.

Other alterations to the shown embodiment or other embodiments may also be provided. Therefore, I wish to be limited not by the circuit shown in the specification and drawings but only by the claims wherein:

I claim:

1. Data modulating apparatus comprising, in combination:

voltage controlled frequency signal generating means including control input means and signal output means;

first means for supplying a carrier frequency signal;

second means, including output means, connected to said signal output means of said signal generating means and to said first means for receiving signals therefrom, said second means supplying signals at said output means thereof indicative of the difference frequency of the signals supplied thereto;

third means for supplying modulating binary data;

fourth means for supplying clock signals; and phase detecting fifth means connected to said second, third, and fourth means for receiving signals therefrom and connected to said control input means of said signal generating means for supplying thereto a control signal indicative of said difference frequency after phase detection with respect to said clock signals and selective amplitude filtration in accordance with said binary data.

2. Apparatus as claimed in claim 1 wherein said second means includes means for doubling the frequency received from said signal generating means and further includes means for mixing said doubled frequency signal with the signal received from said first means.

3. Apparatus as claimed in claim 2 wherein said second means includes a low-pass filter for providing said difference frequency, said signal generating means supplying a frequency modulated output which varies from said carrier frequency by one-fourth the data rate as supplied by said third means.

4. Apparatus as claimed in claim 1 wherein:

the clock signals and the binary data supplied by said fourth and third means, respectively, is supplied at the same rate; and said phase detecting means includes first and second phase detectors for detecting said difference frequency at the positive and negative peaks thereof for providing first and second phase detected signals which are used in the selective amplitude filtration.

5. Apparatus as claimed in claim 1 wherein said phase detection means includes:

first and second combinations of phase detectors and filters from which said selective amplitude filtration is selected; and logic circuitry such that supplied binary data logic 1 signals supply a first amplitude filtered signal to said signal generating means as a control signal and supply the second amplitude filtered signal as the control signal when said binary data is representative of a logic 0.

6. Apparatus as claimed in claim 5 wherein said logic circuitry includes:

sixth and seventh means for supplying the difference amplitude filtered signals;

differential limiting means connected to said sixth and seventh means for providing a limited output indicative of the relative polarity between the input signals received from said sixth and seventh means;

exclusive OR gate means connected for receiving the output of said differential limiting means and for receiving said binary data from said third means and providing output gating signals; and first and second AND gate means for receiving said signals from said sixth and seventh means, respectively, and for gating said signals therefrom through said gate means in accordance with gating signals received from said exclusive OR gate means whereby a logic 1 binary data signal from said third means passes as the control signal to said generating means the more positive of the signals from said sixth and seventh means and a logic 0 binary signal from said third means passes the less positive of the signals from said sixth and seventh means.

7. The method of providing a frequency shift keyed signal of $f_0 \pm R/4$ from a voltage controlled oscillator using a carrier of frequency $f_0$ and data and clock signals synchronized at a rate R comprising the steps of:

doubling the carrier frequency to produce a signal of $2f_0$ Hz;

doubling the frequency shift keyed signal to provide a signal of $2f_0 \pm R/2$ Hz;

mixing the frequency doubled signals;

filtering the mixed signals to provide an output of $R/2$ Hz;

dividing the clock signal to provide first and second opposite phase detection signals;

phase detecting said filter $R/2$ Hz signal in accordance with each of said opposite phase detection signals to provide first and second amplitude signals;

filtering each of said first and second amplitude signals to provide first and second control signals; and supplying one of said first and second control signals to control the frequency of the voltage controlled oscillator in accordance with the logic level of the data signal.

8. Apparatus for providing a frequency shift keyed signal which is binary data modulated with respect to a reference frequency $f_0$ by $\pm R/4$ where R is the data rate comprising, in combination:

oscillator means for supplying an output signal which is controlled in frequency in accordance with an input control voltage;

means for supplying a carrier frequency reference signal;

frequency doubling and combining means connected to said last named means and to said oscillator means for providing an output signal indicative of the difference frequency obtainable by combining frequency doubled versions of said reference carrier frequency signal and the output of said oscillator means;

binary data supplying means having first and second logic levels;

phase detector means connected to the last two named means for supplying one of first and second phase detected control signals to said oscillator means in accordance with the logic level of the binary data, the phase detection occurring with respect to two opposite phase signals.

* * * * *